United States Patent [19]

John et al.

[11] Patent Number: 4,715,697

[45] Date of Patent: Dec. 29, 1987

[54] MICROSCOPE BODY SYSTEM

[75] Inventors: Puthenpurackal K. John, Pittsfold; Arthur H. Shoemaker, Orchard Park, both of N.Y.

[73] Assignee: Cambridge Instruments Inc., Buffalo, N.Y.

[21] Appl. No.: 806,878

[22] Filed: Dec. 9, 1985

[51] Int. Cl.$^4$ .................... G02B 21/20; G02B 21/36
[52] U.S. Cl. ................... 350/502; 350/514; 350/520
[58] Field of Search ............ 350/508, 511–517, 350/520, 502

[56] References Cited

U.S. PATENT DOCUMENTS

| | | | |
|---|---|---|---|
| 2,634,654 | 4/1953 | Bauersfeld | 350/514 |
| 3,132,200 | 5/1964 | Muller et al. | 350/518 |
| 3,437,398 | 4/1969 | Muller et al. | 350/559 |
| 4,088,410 | 5/1978 | Smith | 350/513 |
| 4,527,869 | 7/1985 | Nihoshi | 350/511 |
| 4,547,047 | 10/1985 | Koike et al. | 350/514 |

FOREIGN PATENT DOCUMENTS 1392446  4/1975  United Kingdom ............ 350/511

*Primary Examiner*—William H. Punter
*Attorney, Agent, or Firm*—Alan H. Spencer

[57] ABSTRACT

A microscope body is adapted to compensate for the deliberately introduced 0.6 percent lateral color of an infinity corrected microscope objective. This compensation of the lateral color by the microscope body is done without introducing objectionable axial color aberration. The microscope body is typically a trinocular body which provides an image to binocular eyepieces for observation by a user or alternatively to both the eyepieces and to a focal plane of a camera.

17 Claims, 7 Drawing Figures

MICROSCOPE BODY SYSTEM

BACKGROUND OF THE INVENTION

1. Field of the Invention:

The present invention relates to microscope bodies and, more particularly, to microscope bodies intended to function with infinity corrected microscope objectives having substantially no aberrations except chosen amounts of lateral color.

2. Description of the Prior Art:

Compound microscope systems are generally of two types. The first type of conventional system utilizes microscope objectives which has one image of the specimen at a predefined image plane, and an eyepiece system which magnifies and presents that image to the observer's eye (or eyes) or a camera film plane. The second conventional type of microscope system is known as the infinity corrected system which uses an objective which exits the light as parallel rays. The infinity corrected systems utilize a telescope objective typically mounted in the body of the microscope to collect parallel light from the microscope objective and convert this to an image at a focal plane for the eyepiece or camera systems. Infinity corrected systems offer advantages over the conventional compound microscope system. One advantage is that the distance between the objectives and the eyepieces need not remain constant. This advantage permits the microscope to be focused by moving the nosepiece without identical and simultaneous movement of the eyepieces. Another advantage is the possibility of inserting accessories between the microscope objective and the microscope body without effecting the microscope system's parfocallity. Still another advantage is that the objective may have residual aberrations that need not be removed by the eyepieces.

However, these prior art infinity corrected systems did not provide good optical quality (absence of field and axial aberrations) for all objectives and/or were sensitive to changes in the distance from microscope objective to telescope objective exceeding about 25 mm.

U.S. Pat. No. 3,132,200 issued May 5, 1964, incorporated herein by reference, discloses a microscope system having a telescope objective mounted in the microscope body for providing an image at the eyepiece focal plane with the light received from a microscope objective. The optical system incorporated a two-component telescope objective intended to correct both lateral and axial residual aberrations. The disclosed system has at least one lateral and one axial aberration corrected by the telescope objective.

U.S. Pat. No. 3,355,234 issued Nov. 28, 1967, incorporated herein by reference, teaches a microscope optical system of the infinity corrected type having a telescope objective characterized by deliberately introduced axial color, coma and astigmatism to correct residual lateral color, coma and tangential curvature of field, characterized by objectives having deliberately introduced over-corrected axial color and deliberately introduced negative coma. The axial aberrations deliberately introduced into the microscope objective are equal to, and opposite in sign to, the corresponding axial aberrations deliberately introduced into the telescope objective.

U.S. Pat. No. 3,437,398 issued Apr. 8, 1969, incorporated herein by reference, discloses a plurality of microscope objectives usable in combination with a single telescope objective. The common telescope objective employs outward coma and undercorrected axial color. With respect to the specifically-mentioned field aberrations of lateral color, tangential curvature of field and astigmatism, the following maximums prevail for any of the cases disclosed:

1. Lateral color at the edge of the field does not exceed about 45 microns as measured by the distance between C and F light in the focal plane of the eyepiece.

2. Tangential curvature of field for all objectives except 100×, in combination with the telescope objective, does not exceed about 0.75PR at the edge of the field in the eyepiece focal plane, where FR (focal range) is equal to the wavelength of sodium D light divided by the square of the numerical aperture $[(n' \sin U')^2]$ in the image space for the particular objective involved. This maximum is established by the 20× apochromat and for all other low and medium power objective is, at most, less than half this maximum, being in some cases very nearly zero. For the 100× objective, the tangential curvature of field, in combination with the telescope objective, is approximately $-5.4FR$ at the edge of the field, the negative sign indicating that the curvature is toward the object being examined.

3. Astigmatism, which reaches a maximum in each case at the edge of the field in the eyepiece focal plane, does not exceed about 1.5FR for any case, and is substantially less than this in most cases.

U.S. Pat. No. 3,309,161 issued Mar. 14, 1967, incorporated herein by reference, discloses a binocular body having mechanical components adapted to permit interpupilary spacing. The binocular body disclosed allows the use of a telescope objective, such as that taught by U.S. Pat No. 3,132,200.

The infinity corrected systems of the patents noted above inherently contain numerous residual aberrations at the eyepiece focal point. Residual field aberrations included coma and astigmatisms, as well as field curvature, while the axial aberrations included axial color and spherical aberrations. The designs of these early infinity corrected systems provided that the residual aberrations were minimized when objectives were in focus with the back focal plane of the objective being a chosen distance from the telescope objective lens system. Changes from the chosen distance exceeding more than 25 millimeters introduced unacceptable amounts of residual aberrations.

Another prior art system improved on the patented infinity corrected system by correcting for axial color and spherical aberration. However, the system contained residual field aberrations of coma and astigmatism, although not present in amounts as large as those in the patented design. This prior art system incorporated objectives having a residual of one (1.0) percent lateral color. Six-tenths (0.6) percent of the lateral color was compensated for by the telescope objective lens system and glass in the microscope body. However, the remaining four-tenths (0.4) percent lateral color present in the eyepiece focal plane required special eyepieces designed to cancel the lateral color present in the eyepiece focal plane. Because the microscope objectives and the telescope objective system each have field and axial aberrations in addition to lateral color, this infinity corrected system was also sensitive to deviations from the chosen distance between the microscope objective and telescope objective system.

The prior art infinity corrected systems, such as the type described above, place substantial limitations on the positioning of the microscope body due to residual axial color and field aberrations. These residual aberrations were exaggerated by changes in the spacing between the microscope objective and telescope objectives exceeding 25 mm. Demands have been placed on microscope manufacturers to design instruments having the ability to accept numerous accessories positioned between the microscope objective and body without an adverse effect on excellent optical quality. For example, the semiconductor industry frequently desires accessory units such as an image erector and/or a back-aperture viewer, as well as a vertical illumination system to be mounted between the nosepiece carrying the objectives and the microscope body. The positioning problem is magnified when a plurality of accessories are used, since this substantially increases the distance between the objectives and the microscope body beyond design limits.

As used herein, the term "microscope body" refers to the telescope objective lens system, which images the light received from infinity corrected objectives, and all subsequent light transmitting glass components associated therewith, that are placed between the objective and the eyepieces and/or photographic image plane.

OBJECT OF THE INVENTION

It is an object of the invention to provide a trinocular body well corrected for axial aberrations and all field aberrations while removing 0.6 percent lateral color and which can switch between a binocular mode of operation and a trinocular mode of operation.

SUMMARY OF THE INVENTION

Microscope bodies according to the present invention include a telescope objective lens system for imaging the light received from infinity objectives at a pair of eyepiece focal planes. The beam divider and reflectors used to provide an image for each eyepiece include glass components forming a part of the telescope lens system. The optical properties of all components of the telescope lens system are selected to remove the chosen residual lateral color of the objectives while avoiding the introduction of other aberrations, particularly axial color. For photomicrography, the microscope body includes at least one movable deflector to allow most or all of the light to be presented to a photographic image plane and at least one glass component, in addition to the telescope objective system.

BRIEF DESCRIPTION OF THE DRAWINGS

The above, as well as other features and advantages of the present invention, can be more readily appreciated through consideration of the detailed description of the invention in conjunction with the several figures, in which.

DESCRIPTION OF THE PREFERRED EMBODIMENTS

Figure 1:
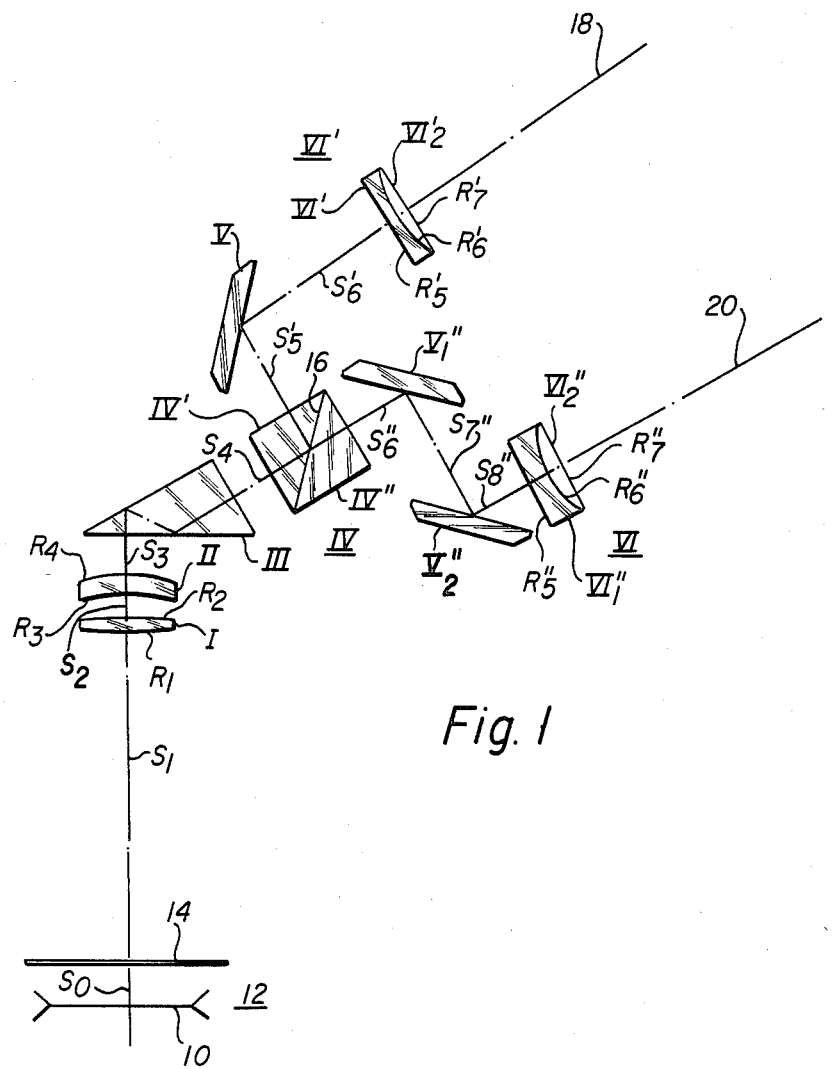
FIG. 1 is an optical diagram of a preferred embodiment of the present invention.

Referring now to FIG. 1, an entrance pupil 10 of an objective 12 is disposed at the beginning of an optical path for light from a specimen (not shown). The objective 12 is infinity corrected and introduces 0.6 percent lateral color aberration and having entrance pupil 10. The lens I such as a simple line, is spaced a distance $S_1$, typically 86.15 mm, from objective shoulder 14 and has a radius of curvature $R_1$ disposed towards the objective 12 and a radius of curvature $R_2$ disposed opposite the objective 12. A second lens II, such as simple line, is disposed at a distance $S_2$ from the first lens I. The lens II has a radius of curvature $R_3$ disposed towards the lens I and a radius of curvature $R_4$ disposed opposite the lens I. From the lens II, a prism III is disposed at a distance $S_3$. The prism III has its hypothenuse side disposed towards the lens II. The prism III deflects the light through two internal reflections, such that it exists the prism III to the right and upwardly. The short side of the triangular configuration of the prism III is disposed upwardly and to the right. At a distance $S_4$ from the prism III, the light from the prism III enters a compound prism IV, wherein in the left half IV' thereof, a portion of the light is reflected upwardly and to the left, and another portion of the light is transmitted through the compound prism IV and through an interface 16 between the halves IV' and EV'' of the compound prism IV. The light leaving the left half IV' of the compound prism IV exits therefrom and is reflected from another reflecting element V', such as a mirror, which is disposed a distance $S_5'$ from the left half portion IV' of the prism IV. The light from the reflecting element V' is reflected to be transmitted through a doublet VI', being comprised of two halves $VI_1'$ and $VI_2$. The doublet VI' is disposed at a distance $S_6'$ from the reflecting element V'. Typically, the right eye of a viewer will be disposed at position 18. The doublet VI' has a surface with a radius $R_5'$ disposed towards the mirror V', an internal radius within the doublet which is $R_6'$ and an external radius disposed away from the mirror V' which is designated by $R_7'$. The light which passes straight through the compound prism IV is reflected by a reflecting element $V_1''$, such as a mirror, which is disposed at a distance $S_6''$ from the prism IV. The mirror $V_1''$ is disposed at a distance $S_7''$ from another mirror $V_2''$ which is disposed to reflect the light from the first mirror $V_1''$. From this second mirror $V_2''$, there is disposed, at a distance $S_8''$, a doublet VI'' such that the light from the mirror $V_2''$ is preferably directed towards the left eye of an observer at a position indicated by 20. The doublet VI'' has a radius of curvature $R_5''$ which is disposed towards the mirror $V_2''$ and an internal radius between the lenses of the doublet $R_6''$ and additionally a radius of curvature $R_7''$ which is disposed towards the left eye of the observer indicated by position 20. The combination of optical elements I-VI' and I-VI'' corrects for the 0.6 percent lateral color deliberately introduced by the objective 12. The elements IV through VI' and VI'' are shown rotated 90° for clearer representation.

Lens I has radii of curvature $R_1$ and $R_2$, which are positive and negative, respectively. Lens II has radii of curvature $R_3$ and $R_4$ which are both negative. Lens $VI_1'$ has a radius of $R_5'$ which is equal to infinity, and another radius of $R_6'$ which is positive. Lens $VI_2'$ has one radius $R_6'$ and another radius $R_7'$ which is equal to infinity. Lens $VI_1''$ has one radius $R_5''$ which is equal to infinity and another radius $R_6''$ which is positive. Lens $VI_2''$ has a radius $R_6''$ which is positive and another radius $R_7''$ which is equal to infinity. In this Table I, and in Table II, the various headings are the names of the specific optical elements, whether it be a lens, a prism or a mirror. The second column is $N_d$, which is the refractive index of the glass used in each case for each element, $V_d$ is the Abbe number of the glass in each case for each element, and the reference characters of the lenses, mirrors and prisms are those as indicated in FIG. 1. The fourth column of Table I shows the radii of the optical elements and the fifth or last column is the thickness of each optical element, the displacement of one optical element with respect to its adjacent optical element, and in the case of prisms, the path length of the light beam in geometrical measure within each prism, as well as the angle of the smallest acute angle of the prisms which are all preferably right-angled prisms.

Figure 2:
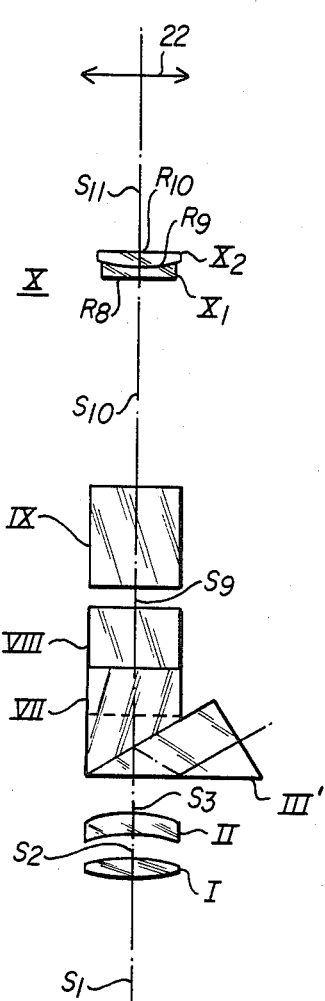
FIG. 2 is an optical diagram of a preferred embodiment of the present invention providing for photomicrography.

The elements, as shown and enumerated in FIG. 1, are described with more specificity in the following Table I.

shown, as in FIG. 1. Elements IV through VI' and VI'' have been omitted for greater clarity. In addition, lenses I and II, having the same spacing as in FIG. 1, are also shown. In the embodiment of FIG. 2, a prism III' , equivalent to prism III of FIG. 1, has disposed thereon another prismatic element VII, which is attached thereto, preferably by cementing, such that a portion of the thereto, preferably by cementing, such that a portion of the light entering the prism III' also is transmitted through the prismatic element VII, whereby the light passing through the prismatic element VII will ultimately form an image on a photographic plate. Disposed adjacent to the prismatic element VII is another glass element VIII, and spaced from the other side of the glass element VIII at a distance $S_9$ is yet another optical element IX. Spaced from the element IX at a distance $S_{10}$ is a color correcting doublet X, and spaced from this doublet X is the focal plane of the camera 22 at a distance of $S_{11}$. The optical element IX is preferably a glass plug. The color correcting doublet X has a surface $R_8$ with an infinite radius of curvature, an inner surface between the two elements of the doublet which are $X_1$ and $X_2$ which internal surface has a radius of curvature of $R_9$. Further the surface of the doublet facing the focal plane of the camera 22 is designated by $R_{10}$ and is preferably flat. The elements, as shown and

TABLE I

| | | $N_d$ | $V_d$ | RADII (in millimeters) | THICKNESS & DISTANCE (in millimeters) |
|---|---|---|---|---|---|
| LENSES | | | | | |
| I | | 1.49694 | 81.60 | $R_1 = +195.410$ | $t_1 = 5.00$ |
| | | | | $R_2 = -69.54$ | $S_2 = 5.681$ |
| II | | 1.63964 | 39.59 | $R_3 = -65.297$ | $t_2 = 4.974$ |
| | | | | $R_4 = -119.25$ | $S_3 = 10.345$ Adjustable |
| PRISMS | | | | | |
| III | | 1.5230 | 58.6 | | P.L. (geo.) = 40.720 |
| | | | | | Angle = 32° |
| | | | | | $S_4 = 10.5$ |
| IV | IV' (left) | 1.5230 | 58.6 | | P.L. (geo.) = 24.00 |
| | | | | | Angle = 45° |
| | IV'' (right) | 1.5230 | 58.6 | | P.L. (geo.) = 12.00 |
| | | | | | Angle = 45° |
| MIRRORS | | | | | |
| V' | | | | flat | $S_5' = 23.855$ |
| $V_1''$ | | | | flat | $S_6'' = 16.485$ |
| $V_2''$ | | | | flat | $S_7'' = 37.009$ |
| LENSES | | | | | |
| VI' | $VI_1'$ | 1.58904 | 61.23 | $R_5' = \infty$ | $t_{61}' = 3.00$ |
| | | | | $R_6' = +29.950$ | $S_6' = 47.309$ |
| | $VI_2'$ | 1.58909 | 40.91 | $R_6' = +29.950$ | $t_{62}' = 4.073$ |
| | | | | $R_7' = \infty$ | distance: none |
| VI'' | $VI_1''$ | 1.58904 | 61.23 | $R_5'' = \infty$ | $t_{61}'' = 6.287$ |
| | | | | $R_6'' = +29.950$ | $S_8'' = 17.580$ |
| | $VI_2''$ | 1.58909 | 40.91 | $R_6'' = +29.950$ | $t_{62}'' = 4.073$ |
| | | | | $R_7'' = \infty$ | distance: none |

In FIG. 2, the same elements of the entrance pupil 10 in the objective 12 and the objective shoulder 14 are enumerated in FIG. 2, are described with more specificity in the following Table II.

TABLE II

| | $N_d$ | $V_d$ | RADII (in millimeters) | THICKNESS & DISTANCE (in millimeters) |
|---|---|---|---|---|
| PRISM | | | | |
| VII | 1.5230 | 58.6 | | P.L. (geo.) = 22.176 |
| | | | | Angle = 29° |
| | | | | Sharp Height = 25.359 |
| | | | | distance: none |
| LENS FILLER | | | | |
| VIII | 1.5230 | 58.6 | | P.L. (geo.) = 30.00 |
| | | | | $S_9 = 4.656$ |
| GLASS PLUG | | | | |
| IX | 1.59538 | 39.17 | | P.L. (geo.) = 27.930 |
| | | | | $S_{10} = 52.475$ |

TABLE II-continued

| | | $N_d$ | $V_d$ | RADII (in millimeters) | THICKNESS & DISTANCE (in millimeters) |
|---|---|---|---|---|---|
| LENS | | | | | |
| X | $X_1$ | 1.58904 | 61.23 | $R_8 = \infty$ | $t_{101} = 3.00$ |
| | | | | $R_9 = +41.35$ | distance: none |
| | $X_2$ | 1.58909 | 40.91 | $R_9 = +41.35$ | $t_{102} = 4.00$ |
| | | | | $R_{10} = \infty$ | |

Distance from the upper surface of Lens II to the camera focal plane is 193.725 millimeters The embodiment of FIG. 1 shows the laterally color compensated microscope body operating with the prism III which projects substantially all of the light into the binocular body. In Figure 2, a portion of the light from the objective is reflected to the binocular body and another portion is transmitted through the prism III' into a trinocular portion of the microscope body, such that an image is formed on the focal plane of the camera 22.

In order to switch between the two embodiments of the microscope body, which are described respectively in FIGS. 1 and 2, the prisms III, and III', having prismatic element VII attached thereto, are movably disposed so that both are alternately positionable in the light from the objective. When only the binocular portion of the microscope body is to be used, the prism III is positioned in this path, thereby only providing an image to the binocular eyepieces. However, if both the camera and the binocular eyepieces are to be utilized, the prism III is moved from the optical path and the prismatic combination III' and VII is disposed therein instead, whereby the light is transmitted not only to the binocular eyepieces, but also to the camera. Thereby, the entire trinocular capabilities of the microscope body are utilized.

Figure 3:
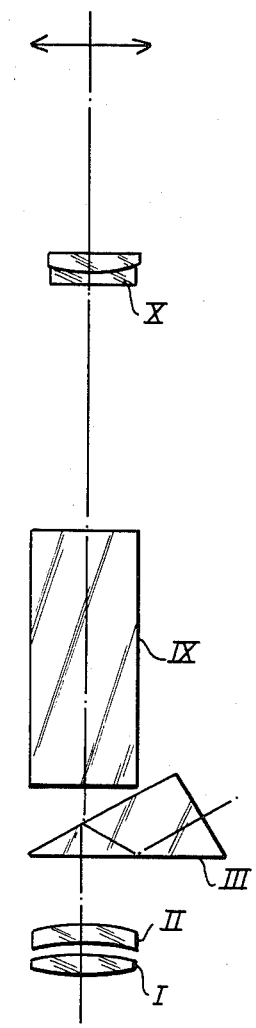
FIGS. 3, 4 and 5 are optical diagrams similar to that of FIG. 2 of an alternative embodiment having a movable deflector positioned in an alternative position to that of the movable deflector of the embodiment of FIG. 2.

FIG. 3 shows an embodiment of the invention where the prism III is positionable and positioned in the path of light from the lenses I and II.

Figure 4:
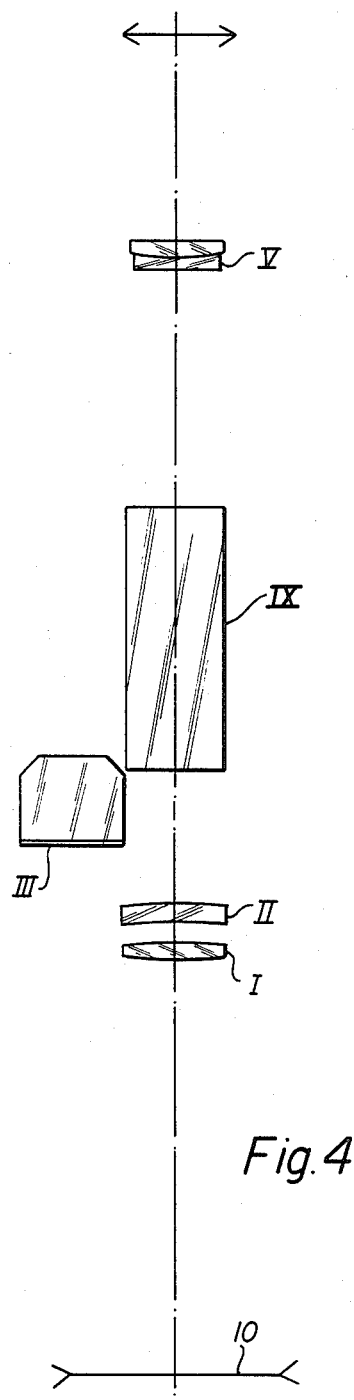

FIG. 4 shows the prism III is a second position displaced from the light which passes through the lens II. In this case, light will pass from the lens II directly through the glass plug IX and onto the focal plane 22 of a photographic means, not shown in detail. The prism III and the prism III' with the prism VII attached thereto may be moved in and out of the beam from the lenses I and II by any means known in the art. The length of the glass plug IX may be adjusted by insertion of another glass plug of an additional glass plug in order to adjust the optical length of the path from the objective 12 to the focal plane of the camera 22 such that this optical length remains substantially constant during the various uses of the microsope body. The lengthening and shortening of optical paths by the addition of glass plugs or their removal is well known in the art.

Figure 5:
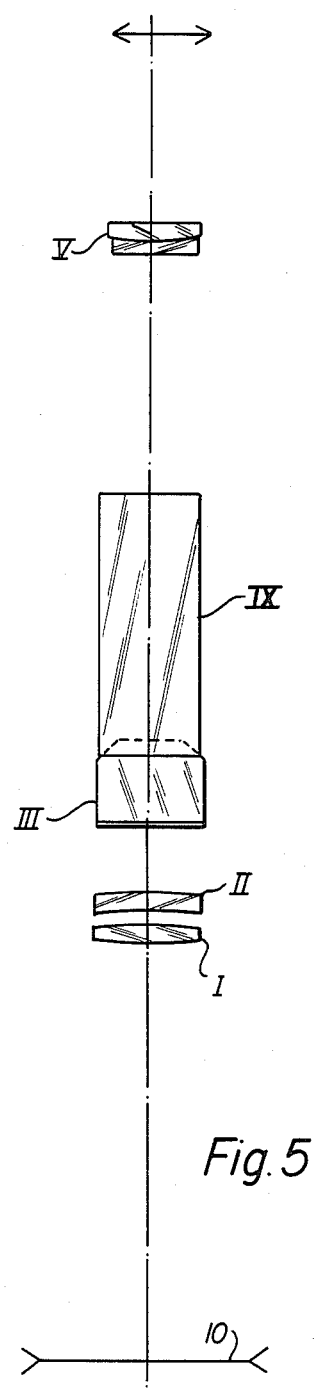

FIG. 5 shows the embodiment of FIGS. 3 and 4 wherein the prism III is shown in an alternative position to the positions illustrated in FIGS. 3 and 4.

Figure 6:
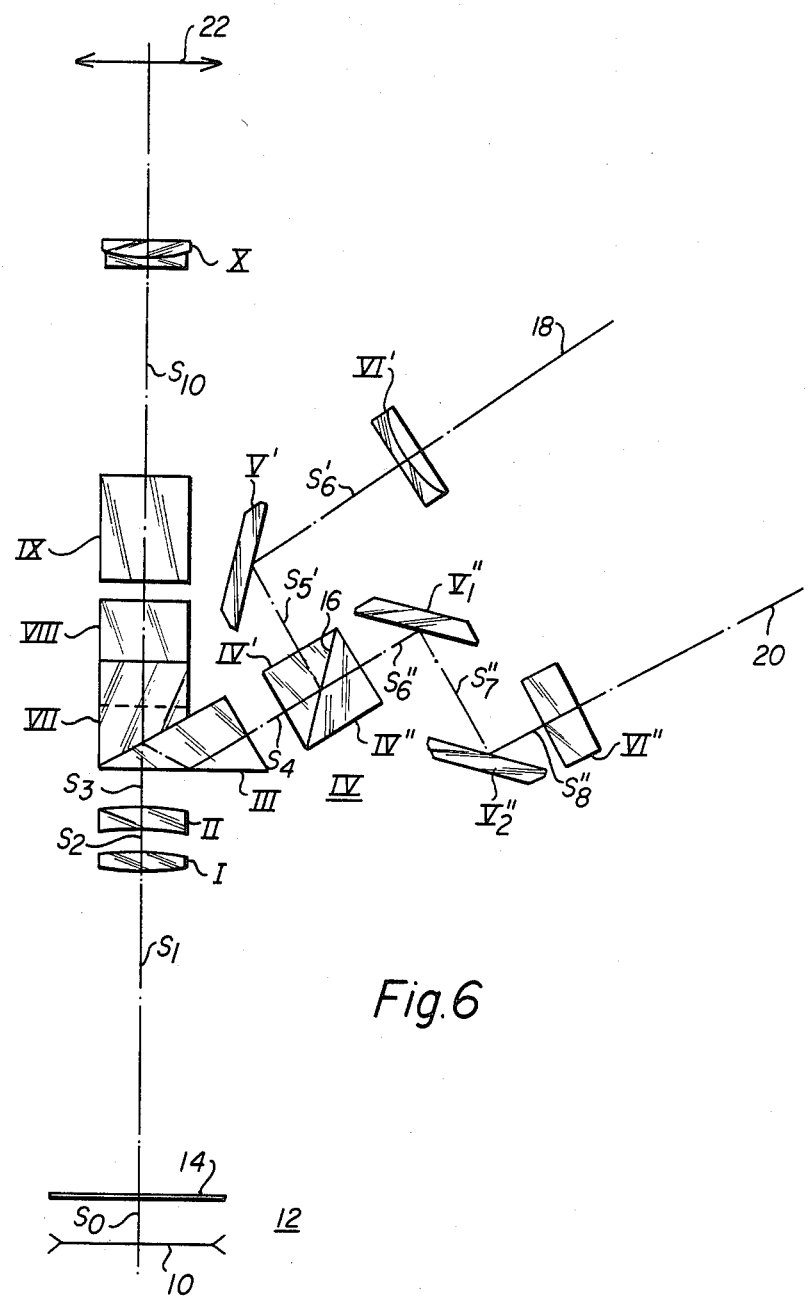
FIG. 6 shows another embodiment of the invention.

FIG. 6 shows an embodiment of the invention wherein the FIGS. 1 and 2 are combined such that the prism III not only transmits light to the plane of the photographic device 22 as illustrated in FIG. 2, but also deflects light to the eyepieces.

Figure 7:
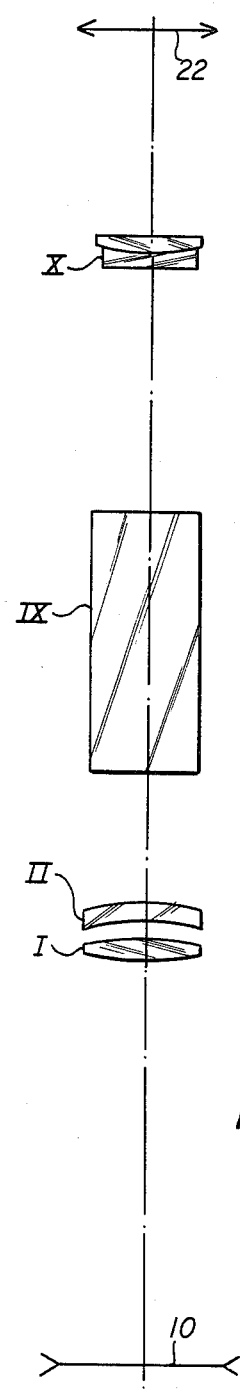
FIG. 7 is an optical diagram of another embodiment providing for photomicrography.

FIG. 7 shows an embodiment of the invention which is adapted for photomicrography. In this case, the prism III and VII and the lens filler VIII have been removed by displacement from the optical axis such that these elements do not deflect or transmit the light from the lenses I and II. In this embodiment, the glass plug is preferably longer in order to compensate for the difference in optical length when the prisms III and VII, and the lens filler VIII are moved and positioned out of the path of light from the lenses I and II. The doublet X is disposed between the glass plug IX and the focal plane of the photographic apparatus 22.

By use of the present invention, a microscope body having typically a lateral color correction of 0.6 percent can be coupled with a microscope objective having a deliberately designed-in lateral color aberration of 0.6 percent such that the resultant combination of the microscope body with the microscope objective can substantially cancel out a major portion of this deliberately-introduced lateral color in the microscope objective. In addition, the present invention does not introduce an appreciable amount of axial color aberration. With the invention, as disclosed, a minimal number of optical elements can be used at a lowering in overall cost of the microscope system such that a high-performance microscope body is available at a substantially lower cost than the prior art.

The invention as described hereinabove in the context of the preferred embodiments is not to be taken as limited to all of the provided details thereof, since modifications and variations thereof may be made without departing from the spirit and scope of the invention.

What is claimed is:

1. A microscope body having an optical system comprising:
   telescope objective means for imaging light from an infinity corrected objective having a predetermined amount of residual lateral color;
   a beam divider receiving light from said telescope objective means;
   means for providing a pair of eyepiece focal planes including light transmitting elements; and
   deflectors to direct light from said telescope objective means to said eyepiece focal planes, said telescope objective means, beam divider and light transmitting elements having individual glass properties selected to compensate, in combination, for said predetermined amount of residual lateral color of the objective without the introduction of axial color aberration.

2. The microscope body according to claim 1 further including a prism deflector positioned between said telescope objective means and said beam divider.

3. The microscope body according to claim 1 further comprising beam deflector means is disposed generally between said telescope objective means and said beam divider and supported for movement between a first position on said optical axis and a second position off said optical axis so that light is directed to said pair of eyepiece focal planes when said deflector means is positioned in said first position on said optical axis and light passes to a photographic image plane when said beam deflector means is positioned at said second position off the optical axis.

4. The microscope body according to claim 3 wherein said beam deflector means is positionable on said optical axis at positions alternative to said first position wherein one of said alternative positions provides a portion of the light to said eyepiece focal planes and a portion of the light to said photographic image plane.

5. The microscope body according to claim 4 wherein said beam deflector means comprises a beam spliter positioned on said optical axis in one of said alternative positions so that a portion of the light is presented to the photographic image plane and another portion of the light is presented to said eyepiece focal planes.

6. A microscope body optical system for receiving light from a microscope objective, said system comprising:
   a simple lens I followed by a simple lens II spaced therefrom, said lens I and said lens II being disposed along an optical path;
   a prism III disposable in use to doubly reflect light received thereby from said lens II and transmit said doubly reflected light at an angle other than along said optical axis of said lens I and said lens II;
   a beam divider IV to split light received from said prism III into two light beams; and
   a pair of eyepiece comprising doublets VI' and VI" disposed each to receive one of said two light beams;
   at least said lenses I and II, said prism III, said beam spliter IV and and said doublets VI' and VI" possessing optical properties wherein said lenses I and II, said prism III, said beam spliter IV and said doublets VI' and VI" collectively correct a predetermined amount of residual lateral color introduced by an infinity corrected microscope objective so that the number of optical elements disposed in said microscope body can be minimized, said lateral color is minimized, and axial color aberration is not appreciably introduced.

7. The microscope body optical system according to claim 6 wherein said doublets VI' and VI" comprise cemented doublets;
   said lens I and said lens II, said prism III, said beam spliter IV and said doublets VI' and VI" are spaced and have values substantially as indicated in the table below, wherein: $N_d$ is the index of refraction; $V_d$ is the Abbe number; S represents the distance between the elements; and the distance, radii and thickness are indicated in millimeters:

TABLE I

| | | $N_d$ | $V_d$ | RADII (in millimeters) | THICKNESS & DISTANCE (in millimeters) |
|---|---|---|---|---|---|
| LENSES | | | | | |
| I | | 1.49694 | 81.60 | $R_1 = +195.410$ | $t_1 = 5.00$ |
| | | | | $R_2 = -69.54$ | $S_2 = 5.681$ |
| II | | 1.63964 | 39.59 | $R_3 = -65.297$ | $t_2 = 4.974$ |
| | | | | $R_4 = -119.25$ | $S_3 = 10.345$ Adjustable |
| PRISMS | | | | | |
| III | | 1.5230 | 58.6 | | P.L. (geo.) = 40.720 |
| | | | | | Angle = 32° |
| | | | | | $S_4 = 10.5$ |
| IV | IV' (left) | 1.5230 | 58.6 | | P.L. (geo.) = 24.00 |
| | | | | | Angle = 45° |
| | IV" (right) | 1.5230 | 58.6 | | P.L. (geo.) = 12.00 |
| | | | | | Angle = 45° |
| MIRRORS | | | | | |
| V' | | | | flat | $S_5' = 23.855$ |
| $V_1''$ | | | | flat | $S_6'' = 16.485$ |
| $V_2''$ | | | | flat | $S_7'' = 37.009$ |
| LENSES | | | | | |
| VI' | $VI_1'$ | 1.58904 | 61.23 | $R_5' = \infty$ | $t_{61}' = 3.00$ |
| | | | | $R_6' = +29.950$ | $S_6' = 47.309$ |
| | $VI_2'$ | 1.58909 | 40.91 | $R_6' = +29.950$ | $t_{62}' = 4.073$ |
| | | | | $R_7' = \infty$ | distance: none |
| VI" | $VI_1''$ | 1.58904 | 61.23 | $R_5'' = \infty$ | $t_{61}'' = 6.287$ |
| | | | | $R_6'' = +29.950$ | $S_8'' = 17.580$ |
| | $VI_2''$ | 1.58909 | 40.91 | $R_6'' = +29.950$ | $t_{62}'' = 4.073$ |
| | | | | $R_7'' = \infty$ | distance: none |

8. The microscope body optical system according to claim 6 wherein said prism III has:
   a second prism VII disposed and making contact with said prism III;
   a lens filler VIII disposed in contact with said prism VII on a surface of said prism VII which is opposite a surface in contact with said prism III;
   a glass plug IX spaced from said lens filler VIII; and
   a doublet X spaced to receive light from said glass plug IX.

9. The microscope body optical system according to claim 7 wherein said prism III has:
   a second prism VII disposed and making contact with said prism III;
   a lens filler VIII disposed in contact with said prism VII on a surface of said prism VII which is opposite a surface in contact with said prism III;
   a glass plug IX spaced from said lens filler VIII; and
   a doublet X spaced to receive light from said glass plug IX.

10. The microscope body optical system according to claim 9 wherein said doublet X comprises a lens $X_1$ and $X_2$,
   said second prism VII, said lens filler VIII, and said doublet X are spaced and have dimensions substantially indicated in the table below, wherein: $N_d$ is the index of refraction; $V_d$ is the Abbe number; S represents the distance between the elements; and the distance, radii and thickness are indicated in millimeters:

TABLE II

| | | $N_d$ | $V_d$ | RADII (in millimeters) | THICKNESS & DISTANCE (in millimeters) |
|---|---|---|---|---|---|
| PRISM | | | | | |
| VII | | 1.5230 | 58.6 | | P.L. (geo.) = 22.176 |
| | | | | | Angle = 29° |
| | | | | | Sharp Height = 25.359 |
| | | | | | distance: none |
| LENS FILLER | | | | | |
| VIII | | 1.5230 | 58.6 | | P.L. (geo.) = 30.00 |
| | | | | | $S_9$ = 4.656 |
| GLASS PLUG | | | | | |
| IX | | 1.59538 | 39.17 | | P.L. (geo.) = 27.930 |
| | | | | | $S_{10}$ = 52.475 |
| LENS | | | | | |
| X | $X_1$ | 1.58904 | 61.23 | $R_8 = \infty$ | $t_{101}$ = 3.00 |
| | | | | $R_9 = +41.35$ | distance: none |
| | $X_2$ | 1.58909 | 40.91 | $R_9 = +41.35$ | $t_{102}$ = 4.00 |
| | | | | $R_{10} = \infty$ | |

Distance from the upper surface of Lens II to the camera focal plane is 193.725 millimeters 11. The microscope body optical system according to claim 6 wherein said prism III is movable from a position to deflect light from said lenses I and II to said pair of eyepieces and another position wherein said light is not deflected to said pair of eyepieces.

12. The microscope body optical system according to claim 8 wherein said prism III and said prism VII are cemented together to form an optical unit wherein a portion of the light from said lens I and said lens II is deflected to said pair of eyepieces and another portion of the light is transmitted through said prism III into said prism VII to a photographic means disposed to form an image from light transmitted through said prism VII.

13. The microscope body optical system according to claim 12 wherein said prism III and said prism VII forming said optical unit are movable from a position to deflect light from said lenses I and II to said pair of eyepieces and another position wherein said light is not deflected to said pair of eyepieces.

14. The microscope body optical system according to claim 12 wherein said optical unit comprising said prism III and said prism VII has a position wherein said light from said lens I and said lens II is transmitted and reflected therethrough and said optical unit has a second position wherein said light from said lens I and said lens II is not impinged upon said optical unit comprising said prism III and said prism VII.

15. A microscope body optical system for receiving light from a microscope objective, said system comprising:

a simple lens I followed by a simple lens II spaced therefrom, said lens I and said lens II being disposed along an optical path;

a prism III disposable in use to doubly reflect light received thereby from said lens II and transmit said doubly reflected light at an angle other than along said optical axis of said lens I and said lens II;

a beam divider IV to split light received from said prism III into two light beams; and a pair of eyepieces comprising doublets VI' and VI'' disposed each to receive one of said two light beams;

at least said lenses I and II, said prism III, said beam spliter IV and said doublets VI' and VI'' correcting a predetermined amount of residual color and deduced by an infinity corrected microscope objective, whereby the number of optical elements disposed in said microscope body is minimized, and whereby said lateral color is minimized, and further whereby axial color aberration is also minimized;

said doublets VI' and VI'' comprise cemented doublets;

said lens I and said lens II, said prism III, said beam spliter IV and said doublets VI' and VI'' are spaced and have values substantially as indicated in the table below, wherein: $N_d$ is the index of refraction; $V_d$ is the Abbe number; S represents the distance between the elements; and the distance, radii and thickness are indicated in millimeters;

TABLE I

| | | $N_d$ | $V_d$ | RADII (in millimeters) | THICKNESS & DISTANCE (in millimeters) |
|---|---|---|---|---|---|
| LENSES | | | | | |
| I | | 1.49694 | 81.60 | $R_1 = +195.410$ | $t_1$ = 5.00 |
| | | | | $R_2 = -69.54$ | $S_2$ = 5.681 |
| II | | 1.63964 | 39.59 | $R_3 = -65.297$ | $t_2$ = 4.974 |
| | | | | $R_4 = -119.25$ | $S_3$ = 10.345 Adjustable |
| PRISMS | | | | | |
| III | | 1.5230 | 58.6 | | P.L. (geo.) = 40.720 |
| | | | | | Angle = 32° |
| | | | | | $S_4$ = 10.5 |
| IV | IV' (left) | 1.5230 | 58.6 | | P.L. (geo.) = 24.00 |
| | | | | | Angle = 45° |
| | IV'' (right) | 1.5230 | 58.6 | | P.L. (geo.) = 12.00 |
| | | | | | Angle = 45° |

TABLE I-continued

| | | $N_d$ | $V_d$ | RADII (in millimeters) | THICKNESS & DISTANCE (in millimeters) |
|---|---|---|---|---|---|
| MIRRORS | | | | | |
| V' | | | | flat | $S_5' = 23.855$ |
| $V_1''$ | | | | flat | $S_6'' = 16.485$ |
| $V_2''$ | | | | flat | $S_7'' = 37.009$ |
| LENSES | | | | | |
| VI' | $VI_1'$ | 1.58904 | 61.23 | $R_5' =$ | $t_6' = 3.00$ |
| | | | | $R_6' = +29.950$ | $S_6' = 47.309$ |
| | $VI_2'$ | 1.58909 | 40.91 | $R_6' = +29.950$ | $t_6' = 4.073$ |
| | | | | $R_7' =$ | distance: none |
| VI'' | $VI_1''$ | 1.58904 | 61.23 | $R_5'' = \infty$ | $T_6'' = 6.287$ |
| | | | | $R_6'' = +29.950$ | $S_8'' = 17.580$ |
| | $VI_2''$ | 1.58909 | 40.91 | $R_6 = +29.950$ | $t_6 = 4.073$ |
| | | | | $R_7 = \infty$ | distance: none |

16. The microscope body optical system according to claim 15 wherein said prism III has:
   a second prism VII disposed and making contact with said prism III;
   a lens filler VIII disposed in contact with said prism VII on a surface of said prism VIII which is opposite a surface in contact with said prism III;
   a glass plug IX spaced from said lens filler VIII; and
   a doublet X spaced to receive light from said glass plug IX.

17. The microscope body optical system according to claim 16 wherein said doublet X comprises a lens $X_1$ and $X_2$,
   said second prism VII, said lens filler VIII, and said doublet X are spaced and have dimensions substantially indicated in the table below, wherein: $N_d$ is the index of refraction; $V_d$ is the Abbe number; S represents the distance between the elements; and the distance, radii and thickness are indicated in millimeters:

TABLE II

| | | $N_d$ | $V_d$ | RADII (in millimeters) | THICKNESS & DISTANCE (in millimeters) |
|---|---|---|---|---|---|
| PRISM | | | | | |
| VII | | 1.5230 | 58.6 | | P.L. (geo.) = 22.176 |
| | | | | | Angle = 29° |
| | | | | | Sharp Height = 25.359 |
| | | | | | distance: none |
| LENS FILLER | | | | | |
| VIII | | 1.5230 | 58.6 | | P.L. (geo.) = 30.00 |
| | | | | | $S_9 = 4.656$ |
| GLASS PLUG | | | | | |
| IX | | 1.59538 | 39.17 | | P.L. (geo.) = 27.930 |
| | | | | | $S_{10} = 52.475$ |
| LENS | | | | | |
| X | $X_1$ | 1.58904 | 61.23 | $R_8 = \infty$ | $t_{10} = 3.00$ |
| | | | | $R_9 = +41.35$ | distance: none |
| | $X_2$ | 1.58909 | 40.91 | $R_9 = +41.35$ | $t_{10} = 4.00$ |
| | | | | $R_{10} = \infty$ | |

* * * * *